(12) United States Patent
Wen et al.

(10) Patent No.: US 7,613,995 B2
(45) Date of Patent: Nov. 3, 2009

(54) VISION-BASED DOCUMENT SEGMENTATION

(75) Inventors: Ji-Rong Wen, Beijing (CN); Shipeng Yu, Beijing (CN); Deng Cai, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 11/275,488

(22) Filed: Jan. 9, 2006

(65) Prior Publication Data

US 2006/0106798 A1   May 18, 2006

Related U.S. Application Data

(62) Division of application No. 10/628,766, filed on Jul. 28, 2003, now Pat. No. 7,428,700.

(51) Int. Cl.
G06F 17/00 (2006.01)
(52) U.S. Cl. .................. 715/209; 715/247; 715/254
(58) Field of Classification Search .............. 715/200, 715/206, 209, 231, 246, 247, 253, 254, 272, 715/277
See application file for complete search history.

(56) References Cited

U.S. PATENT DOCUMENTS

| | | | |
|---|---|---|---|
| 5,619,709 A * | 4/1997 | Caid et al. ................ 715/209 |
| 5,802,515 A * | 9/1998 | Adar et al. ................ 707/5 |
| 6,567,103 B1 * | 5/2003 | Chaudhry ................ 715/738 |
| 6,584,465 B1 * | 6/2003 | Zhu et al. ................ 707/6 |
| 6,701,015 B2 | 3/2004 | Fujimoto et al. |
| 6,721,451 B1 | 4/2004 | Ishitani |
| 6,754,885 B1 | 6/2004 | Dardinski et al. |
| 6,798,913 B2 | 9/2004 | Toriyama |
| 6,880,122 B1 | 4/2005 | Lee et al. |
| 6,963,867 B2 * | 11/2005 | Ford et al. ................ 707/3 |
| 7,003,159 B2 | 2/2006 | Yamaai |
| 7,010,745 B1 | 3/2006 | Shimada et al. |
| 7,010,746 B2 | 3/2006 | Purvis |
| 7,346,604 B1 * | 3/2008 | Bharat et al. ................ 707/3 |
| 2002/0065842 A1 | 5/2002 | Takagi et al. |

(Continued)

FOREIGN PATENT DOCUMENTS

CN     1296589     5/2001

OTHER PUBLICATIONS

Gu, X., Chen, J., Ma, W.-Y., and Chen, G., "Visual Based Content Understanding towards Web Adaptation," In Second International Conference on Adaptive Hypermedia and Adaptive Web-based Systems (AH2002), Spain, 2002, 10 pages.

(Continued)

*Primary Examiner*—Stephen S Hong
*Assistant Examiner*—Gregory J Vaughn
(74) *Attorney, Agent, or Firm*—Lee & Hayes, PLLC

(57) ABSTRACT

Vision-based document segmentation identifies one or more portions of semantic content of a document. The one or more portions are identified by identifying a plurality of visual blocks in the document, and detecting one or more separators between the visual blocks of the plurality of visual blocks. A content structure for the document is constructed based at least in part on the plurality of visual blocks and the one or more separators, and the content structure identifies the one or more portions of semantic content of the document. The content structure obtained using the vision-based document segmentation can optionally be used during document retrieval.

19 Claims, 11 Drawing Sheets

U.S. PATENT DOCUMENTS

| | | | |
|---|---|---|---|
| 2002/0069190 A1* | 6/2002 | Geiselhart | 707/1 |
| 2002/0111968 A1* | 8/2002 | Ching | 707/514 |
| 2002/0123994 A1* | 9/2002 | Schabes et al. | 707/5 |
| 2002/0129014 A1* | 9/2002 | Kim et al. | 707/5 |
| 2003/0050909 A1* | 3/2003 | Preda et al. | 707/1 |
| 2004/0013302 A1 | 1/2004 | Ma et al. | |
| 2004/0186827 A1* | 9/2004 | Anick et al. | 707/3 |
| 2004/0205608 A1 | 10/2004 | Huang | |

OTHER PUBLICATIONS

Chen, J., Zhou, B., Shi, J., Zhang, H., and Wu, Q., "Function-Based Object Model Towards Website Adaptation," In Proceedings of the 10th International World Wide Web Conference, 2001, 10 pages.

Yang, Y. and Zhang, H., "HTML Page Analysis Based on Visual Cues," In 6th International Conference on Document Analysis and Recognition (ICDAR 2001), Seattle, Washington, USA, 2001, 6 pages.

Tang, Y. Y., Cheriet, M., Liu, J., Said, J. N., and Suen, C. Y., "Document Analysis and Recognition by Computers," Handbook of Pattern Recognition and Computer Vision, edited by C. H. Chen, L. F. Pau, and P. S. P. Wang, World Scientific Publishing Company, 1999, 37 pages.

Robertson, S. E. and Walker, S., "Okapi/Keenbow at TREC-8," In The Eighth Text REtrieval Conference (TREC 8), 1999, 11 pages.

Callan, J. P., "Passage-Level Evidence in Document Retrieval," In Proceedings of the Seventeenth Annual International ACM SIGIR Conference on Research and Development in Information Retrieval, Dublin, 1994, pp. 302-310.

Cai et al., "Extracting Content Structure for Web Pages Based on Visual Representation" Proceedings fo 5th Asia-Pacific Web Conference, Lecture Notes on Computer Science, vol. 2642, Apr. 23, 2003 pp. 406-417.

Gu et al., "Visual Based Content Understanding towards Web Adaptation" Proceedings of the Second International Conference on Adaptive Hypermedia and Adaptive Web-Based Systems, Lecture Notes in Computer Science, vol. 2347, May 29, 2002 pp. 164-173.

Gu et al., "Visual Based Content Understanding towards Web Adaptation" Proceedings of the Second International Conference on Adaptive Hypermedia and Adaptive Web-Based Systems, Lecture Notes in Computer Science, vol. 2347, May 29, 2002 pp. 164-173.

\* cited by examiner

VISION-BASED DOCUMENT SEGMENTATION

RELATED APPLICATIONS

This application is a divisional of U.S. patent application Ser. No. 10/628,766, filed Jul. 28, 2003, which is hereby incorporated by reference herein.

TECHNICAL FIELD

This invention relates to partitioning documents, and particularly to vision-based document segmentation.

BACKGROUND

People have access to a great deal of information. However, finding the particular information they desire in any given situation can be very difficult. For example, a large amount of information is accessible to people over the Internet in the form of web pages. The number of such web pages can be on the order of millions or more. Additionally, the web pages available are constantly changing, with some pages being added, others being deleted, and others being modified.

Thus, when someone desires to find some information, such as the answer to a question, the ability to extract particular information from this large information source becomes very important. Processes and techniques have been developed to allow users to search for information over the Internet, and are commonly made available to the user in the form of search engines. However, the accuracy of such search engines can be lacking due in large part to the extremely broad range of content on web pages that are searched. For example, some web pages include copyright and other business-related notices, and some web pages include advertisements. Such business-related and advertising data is not always relevant to the underlying content of the web page, and thus can reduce the accuracy of the searching process if it is considered. By way of another example, different web pages can vary greatly in length, and some may include multiple topics while others contain a single topic.

These characteristics of web pages can reduce the accuracy of search processes. Thus, it would be beneficial to have a way to increase the accuracy of searching documents.

SUMMARY

Vision-based document segmentation is described herein.

In accordance with one aspect, one or more portions of semantic content of a document are identified. The one or more portions are identified by identifying a plurality of visual blocks in the document, and detecting one or more separators between the visual blocks of the plurality of visual blocks. A content structure for the document is constructed based at least in part on the plurality of visual blocks and the one or more separators, and the content structure identifies the different visual blocks as different portions of semantic content of the document.

In accordance with other aspects, the content structure obtained using the vision-based document segmentation is used during document retrieval.

BRIEF DESCRIPTION OF THE DRAWINGS

The same numbers are used throughout the document to reference like components and/or features.

DETAILED DESCRIPTION

Vision-based document segmentation is described herein. The vision-based document segmentation identifies, based on the visual appearance of a document, multiple portions of the document that include the semantic content of that document. The vision-based document segmentation can be used in a variety of different manners. For example, the segmentation can be used when searching for documents, so that the search results are based on the semantic content portions of the document.

The discussions herein refer to documents and models used to describe the structures of the documents. Documents can be in any of a variety of formats, such as in accordance with a Standard Generalized Markup Language (SGML), such as the Extensible Markup Language (XML) format or the HyperText Markup Language (HTML) format. In certain embodiments, these documents are web pages in the HTML format. The models discussed herein can be any of a variety of models that describe the structure of a document. In certain embodiments, the model used is a Document Object Model (DOM). The Document Object Model is a tree-structured representation of a document, also referred to as a DOM tree. In many of the discussions herein, the documents are described as being in the HTML format (e.g., web pages), the model is described as a DOM tree, and each HTML tag of the document is represented by a node in the DOM tree (the DOM tree may also include additional nodes, such as #text or #comment nodes, which may not represent an HTML tag). However, it is to be appreciated that the vision-based document segmentation can also be used with these other documents and/or models.

Figure 1:
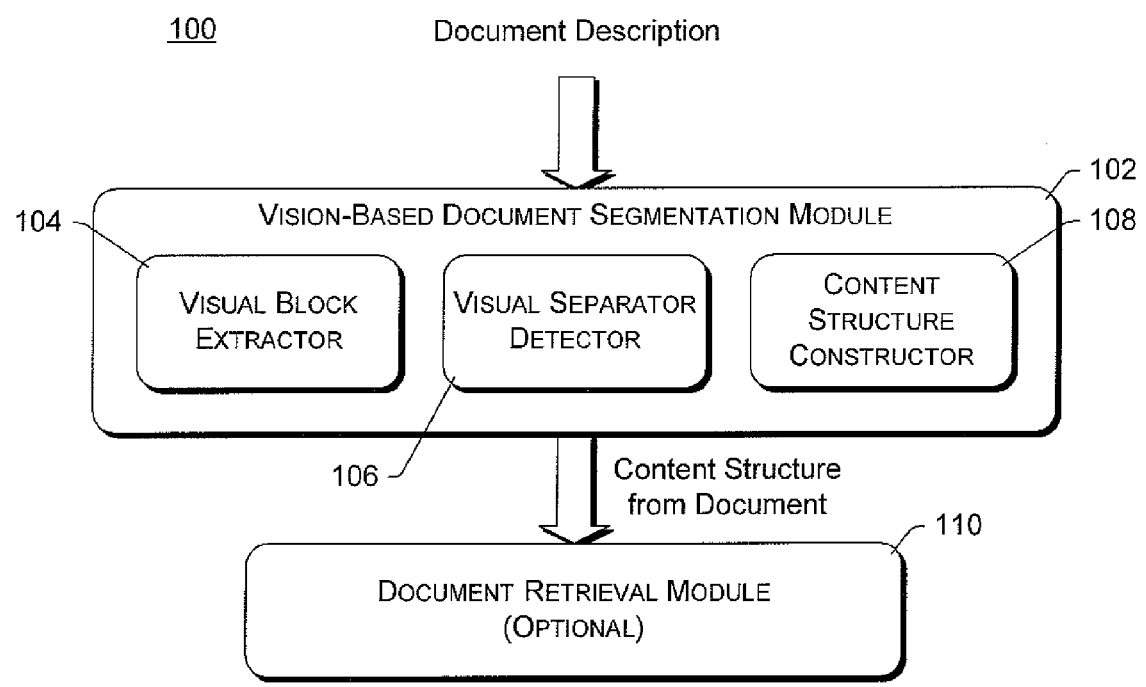
FIG. 1 is a block diagram illustrating an example system using vision-based document segmentation.

FIG. 1 is a block diagram illustrating an example system 100 using the vision-based document segmentation. System 100 includes a vision-based document segmentation module 102 having a visual block extractor 104, a visual separator detector 106, and a content structure constructor 108. A document description is accessible to vision-based document segmentation module 102. This document description is a model that describes the structure of the document such as a DOM tree. The document description may be generated by another component (not shown) and made accessible to module 102, or alternatively the document itself may be accessible to module 102 and module 102 may generate the document description.

Visual block extractor 104 identifies, based on the document description, multiple visual blocks of the document. This identification (also referred to herein as extraction) of the visual blocks is based on visual cues within the document, such as font sizes and/or types, colors of fonts and/or background information, HTML tag type, and so forth. The identified blocks are regions of the document. The identified blocks are output by extractor 104 and made available to visual separator detector 106.

Visual separator detector 106 detects separators between different ones of the identified blocks. These separators can take a variety of different forms, such as lines in the document, blank space in the document, different background colors for different blocks, and so forth. In certain embodiments, separators in the horizontal and/or vertical direction in the document are detected. These detected separators are made available to content structure constructor 108.

Content structure constructor 108 generates a content structure for the document based on the blocks identified by extractor 104 as well as the separators detected by detector 106. The content structure is a set of one or more portions of the document that represents the semantic content of a document. The content structure is output by module 102.

The content structure of the document can then be used in a variety of manners. In certain embodiments, system 100 includes an optional document retrieval module 110. Document retrieval module 110 uses the content structure from vision-based segmentation module 102 in determining which documents to return in response to a query. For example, when a user enters one or more search terms when searching for web pages, the content structure can be used in determining which web pages satisfy the criteria.

The manner in which the content structure is used during document retrieval can vary. In some embodiments, the content structure is used to rank the documents that are retrieved in response to the query. Additionally, in some embodiments the content structure is used as a basis for expanding the search criteria. These uses are discussed in more detail below.

It should be noted that the vision-based document segmentation described herein makes use of the way a document would look when it is displayed. The vision-based document segmentation does not require that a document actually be displayed, and the vision-based document segmentation also does not require that the user actually see a displayed document.

Figure 2:
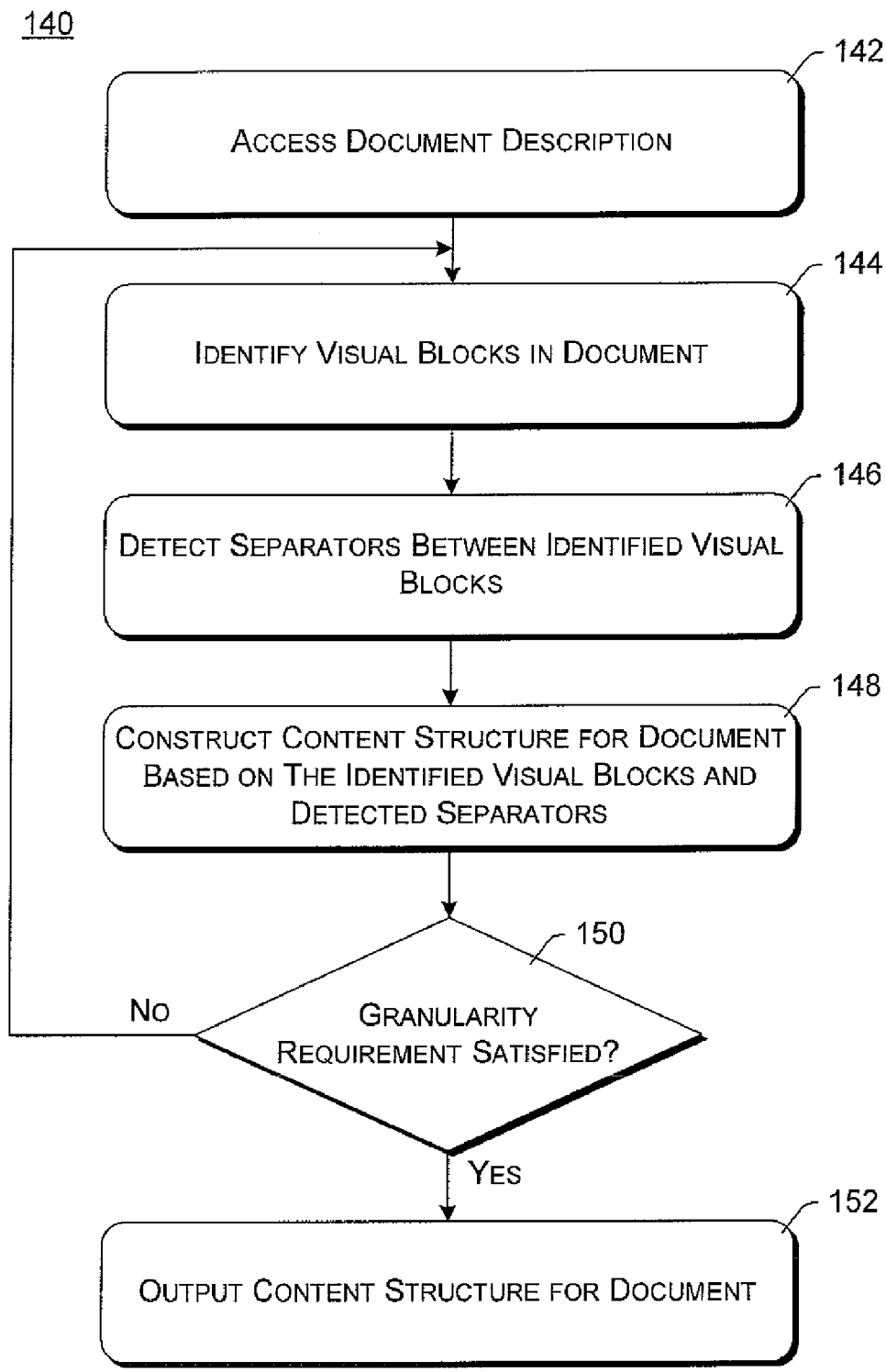
FIG. 2 is a flowchart illustrating an example process for performing vision-based document segmentation.

FIG. 2 is a flowchart illustrating an example process 140 for performing vision-based document segmentation. Process 140 is implemented by vision-based document segmentation module 102 of FIG. 1, and may be performed in software, firmware, hardware, or combinations thereof.

Initially, a document description is accessed (act 142). This document description is, for example, a DOM tree for an HTML web page. With the document description, one or more visual blocks in the document are identified (act 144). Separators between the identified visual blocks are detected (act 146), and a content structure for the document is constructed based on the identified visual blocks and the detected separators (act 148). A check is then made as to whether the content structure satisfies a granularity requirement (act 150). This granularity requirement refers to a degree of coherence (DoC) for the visual blocks of the content structure, which is a measure of how coherent each of the visual blocks is. If the granularity requirement is not satisfied then process 140 returns to act 144, where new visual blocks are identified within the portions of the content structure that did not satisfy the granularity requirement. Once the granularity requirement is satisfied, the content structure for the document is output (act 152). Each pass through the combination of acts 144, 146, and 148 (that is, visual blocks are identified, separators between the identified blocks are detected, and content structure based on the identified visual blocks and detected separators is constructed) is referred to herein as a "round".

Thus, it can be seen that the vision-based document segmentation employs a top-down approach. Generally, an initial set of visual blocks is identified and made available for visual separator detection and content structure construction as discussed below. Within these visual blocks, additional visual blocks are identified in subsequent rounds as appropriate (that is, additional visual blocks are identified in subsequent rounds for each visual block that does not satisfy the granularity requirement).

As discussed herein, the documents being used are assumed to be rectangular in shape when displayed. Thus, some sizes, dimensions, areas, and so forth are described herein with reference to a rectangular or Cartesian coordinate system (e.g., an X,Y-coordinate system). It is to be appreciated that these are only examples, and that the rectangular shapes and the coordinate systems can be different. In some instances, if non-rectangular shapes are used they are converted to rectangular shapes prior to performing the vision-based document segmentation. In other instances, the processes and techniques described herein are adapted to use these different shapes and/or coordinate systems.

Visual Block Identification

Visual block identification, also referred to herein as visual block extraction, identifies different regions of the document based on visual cues. An indication of these different regions is then output and used in the visual separator detection, as discussed in more detail below. Visual block identification (e.g., in act 144 of FIG. 2 or implemented by visual block extractor 104 of FIG. 1) can be performed as follows.

Generally, every node in the DOM tree for a document can represent a visual block. Some large nodes (e.g., having <TABLE> or <P> tags) are typically used only for organization purpose and are not appropriate to represent a single visual block. Thus, such large nodes are further divided and replaced by their children nodes. On the other hand, because of the potentially large number of leaf nodes, the visual blocks should not be initially identified as being every leaf node in the DOM tree (although, due to the top-down nature of the vision-based document segmentation, some of these leaf nodes may eventually be identified as visual blocks).

Figure 3:
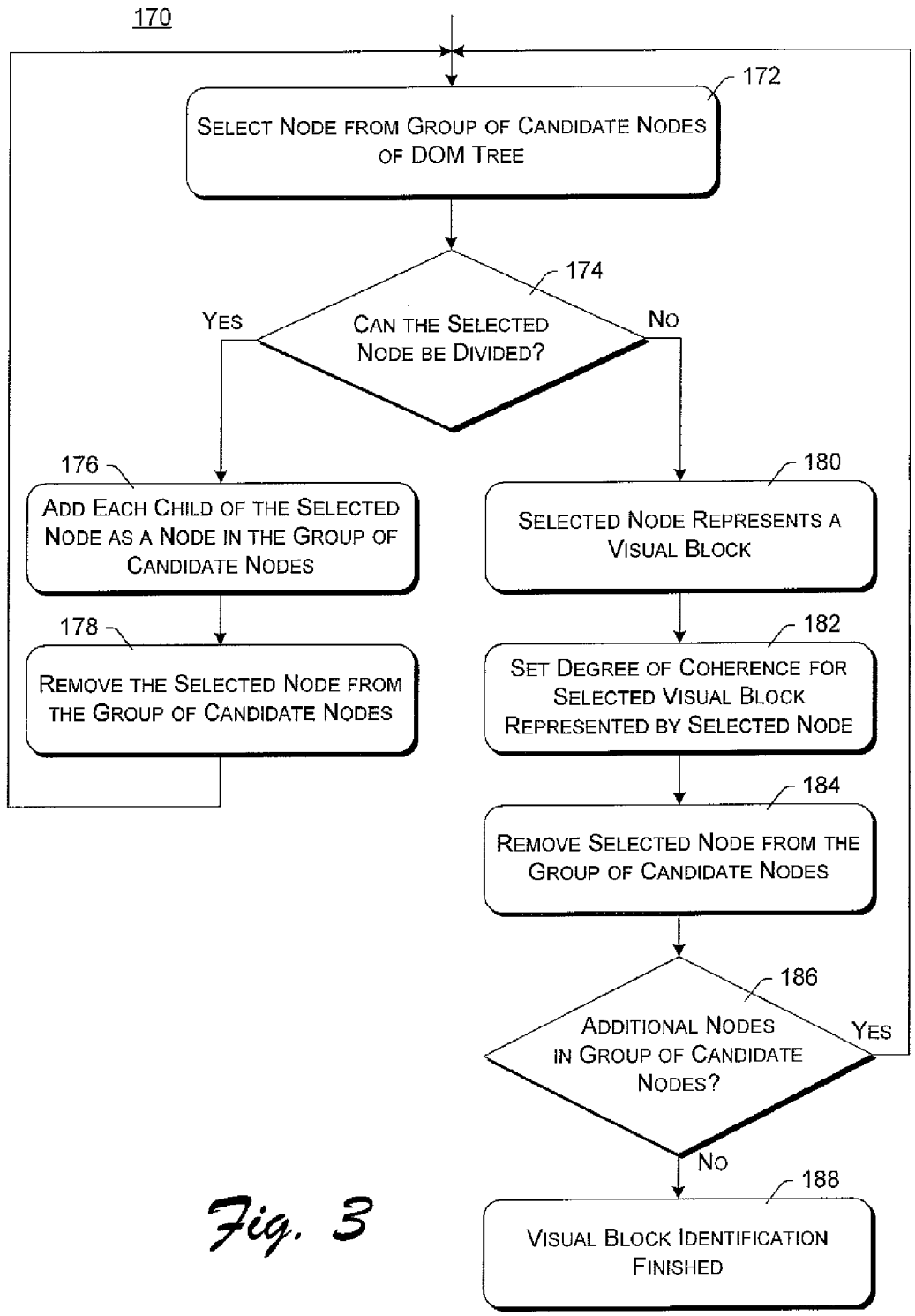
FIG. 3 is a flowchart illustrating an example process for performing visual block identification.

FIG. 3 is a flowchart illustrating an example process 170 for performing visual block identification. Process 170 illustrates act 144 of FIG. 2 in additional detail. Process 170 may be performed in software, firmware, hardware, or combinations thereof.

Initially, a node from a group of candidate nodes of the DOM tree is selected (act 172). This group of candidate nodes refers to nodes of the DOM tree that are potentially visual blocks in the current round. The candidate nodes can change while process 170 is being performed, as discussed in more detail below. In certain embodiments, the group of candidate nodes is initially a single node, the single node being the root node of the DOM tree in the first round or the top node of a subtree of the DOM tree in subsequent rounds (e.g., the top node of a part of the DOM tree corresponding to a visual block that did not satisfy the granularity requirement). Alternatively, the initial group of candidate nodes may be different, such as the nodes one level below the root node in the DOM tree or the nodes one level below the top node of a subtree of the DOM tree.

A check is then made as to whether the selected node can be divided (act 174). If the selected node can be divided, then each child node of the selected node is added to the group of candidate nodes (act 176), and the selected node is removed from the group of candidate nodes (act 178). Process 170 then returns to act 172 and selects another node from the group of candidate nodes.

Returning to act 174, if the selected node cannot be divided, then the selected node represents a visual block (act 180), and is added to a pool of visual blocks being identified by process 170. A degree of coherence (DoC) value is set for the visual block (act 182), as discussed in more detail below, and the selected node is removed from the group of candidate nodes (act 184). A check is also made as to whether there are additional nodes in the group of candidate nodes (act 186). If there are additional nodes in the group of candidate nodes, then process 170 returns to act 172, where one of the nodes is selected from the group of candidate nodes. If there are not additional nodes in the group of candidate nodes, then the visual block identification process 170 is finished (act 188), with the visual blocks selected in act 180 being the visual blocks identified by process 170. This pool of visual blocks identified by process 170 can then be used in the visual separator detection, discussed in more detail below.

The determination of whether a particular node can be divided (in act 174) is made based on one or more rules. These rules make use of one or more cues or information regarding the node and possibly one or more other nodes in the DOM tree. Examples of such cues or information include a tag cue, a color cue, a text cue, and a size cue. Examples of the rules that can be formulated based on these cues follow. In certain embodiments, a default rule (e.g., that the node can be divided, or alternatively that the node cannot be divided) may also be included. The default rule is used if none of the other rules are applicable.

Top Block Rule. The top block rule is based on the location of the node in the tree being evaluated. The top block rule states that if the node is the top node in the tree being evaluated (e.g., the root node of the DOM tree in the first round), then the node can be divided.

Tag Rule: The tag rule is based on the HTML tag of the node. Some HTML tags, such as the <HR> tag, are often used to separate different topics from a visual perspective. The tag rule states that if the HTML tag of one of the children of the node is equal to one of a set of particular tags (e.g., the HTML tag is the <HR> tag), then the node can be divided.

Color Rule: The color rule is based on the background color of the node as well as the background color(s) of the children of the node. The color rule states that if the background color of the node is different from the background color of at least one of its children nodes, then the node can be divided.

Text and Size Rules: Several text and size rules can be used. Reference is made in some of these rules to the height, width, and/or size of a node. The height of a node refers to the visual height of the block (e.g., in pixels using an X,Y-coordinate system) represented by the node when the block is displayed, the width of a node refers to the visual width of the block (e.g., in pixels using an X,Y-coordinate system) represented by the node when the block is displayed, and the area of a node refers to the display area (e.g., in pixels using an X,Y-coordinate system) occupied by the block represented by the node when it is displayed (e.g., the product of the width and height of the node in the case of a rectangular block). These sizes can be readily determined based on the position location information included in the nodes of the DOM tree.

Some of these rules (as well as discussions elsewhere in this description) refer to a valid node, a block node, a text node, a virtual text node, and/or a navigation node. A valid node refers to a node that is visible when the HTML document is displayed (e.g., neither the height nor the width is equal to zero). A block node refers to a node that has some tag other than <A>, <B>, <FONT>, <HR>, <I>, <P>, <STRONG>, <EM> or <TEXT>. A text node refers to a node that only contains free text. A virtual text node refers to a node that is not a block node and only has text nodes as children (or child). A navigation node refers to a node having a height that is more than twice its width, and having a width smaller than 200. In certain implementations, rules regarding navigation nodes are used in the first round, but not in subsequent rounds.

The following text and size cue based rules can be used for nodes having general tags (that is, for all HTML tags except for the <P> tag, the <TABLE> tag, the <TD> tag, and the <UL> tag):
  if the node has no valid children then the node cannot be divided and the node is removed from the group of candidate nodes;
  if the node has only one valid child and the child is not a text node, then trace into the child (remove the node from the group of candidate nodes and replace it with the child node);
  if the node's size is at least three times greater than the sum of its children's sizes, then the node can be divided;
  if all of the children of the node are text nodes or virtual text nodes, then the node cannot be divided;
  if the node has at least one text node child or at least one virtual text node child, and the node's width or height is smaller than a threshold (e.g., 150), then the node cannot be divided;
  if the node is a navigation node, then the node cannot be divided;
  if the node has at least one text node child or at least one virtual text node child, and further does not have a block node child, then the node cannot be divided;
  if the node has more than two successive <BR> children, then the node can be divided; and
  otherwise, the node can be divided.

The following text and size cue based rules can be used for nodes having <P> HTML tags:
  if the node has no valid children then the node cannot be divided and the node is removed from the group of candidate nodes;
  if the node has only one valid child and the child is not a text node, then trace into the child (remove the node from the group of candidate nodes and replace it with the child node);
  if all of the children of the node are text nodes or virtual text nodes, then the node cannot be divided;
  if the sum of all the children's size are greater than this node's size, and there is at least one child that is a block node, then the node can be divided.
  if the node has at least one text node child or at least one virtual text node child, and the node's width or height is smaller than a threshold (e.g., 150), then the node cannot be divided;

if the node has no block node child, then the node cannot be divided.

if all the children of the node are smaller than a threshold (e.g., Width<150 and Height<100), then the node cannot be divided;

otherwise, the node can be divided.

The following text and size cue based rules can be used for nodes having <TABLE> HTML tags:

if the node has no valid children then the node cannot be divided and the node is removed from the group of candidate nodes;

if the node has only one valid child and the child is not a text node, then trace into the child (remove the node from the group of candidate nodes and replace it with the child node);

if the size of the biggest child node of the node is smaller than a threshold (e.g., 250*200), then the node cannot be divided;

if all the children of the node are smaller than a threshold (e.g., Width<150 and Height<100), then the node cannot be divided;

if all the valid node children of the node are bigger than a threshold (e.g., Width>150 and Height>100), then the node cannot be divided.

if some (greater than 0) valid node children of the node are bigger than a threshold (e.g., Width>150 and Height>100) and some (greater than 0) valid node children of the node are smaller than a threshold (e.g., Width<150 and Height<100), then the node cannot be divided.

otherwise, the node can be divided.

The following text and size cue based rules can be used for nodes having <TD> HTML tags:

if the node has no valid children then the node cannot be divided and the node is removed from the group of candidate nodes;

if the node has only one valid child and the child is not a text node, then trace into the child (remove the node from the group of candidate nodes and replace it with the child node);

otherwise, the node cannot be divided.

The following text and size cue based rules can be used for nodes having <UL> HTML tags:

if the node has no valid children then the node cannot be divided and the node is removed from the group of candidate nodes;

if the node has only one valid child and the child is not a text node, then trace into the child (remove the node from the group of candidate nodes and replace it with the child node);

if the node does not have a block node child, then the node cannot be divided;

if all the children nodes of the node have <LI> HTML tags, then the node cannot be divided.

if all the children nodes of the node are smaller than a threshold (e.g., Width<150 and Height<100), then the node cannot be divided otherwise, the node can be divided.

In visual block identification, the degree of coherence (DoC) value is a measure assigned to visual blocks extracted from the DOM tree. A different degree of coherence (DoC) value may also be generated for virtual blocks during the content structure construction, as discussed in more detail below. The DoC value of a visual block (or virtual block) is a measure of how coherent the visual block (or virtual block) is.

The DoC value assigned to a block during visual block identification can be assigned in a variety of different manners. In certain embodiments, the DoC value of a visual block is assigned based on its corresponding node in the DOM tree (the node that represents the visual block), and can vary based on the HTML tag of the node. The following is a set of example rules that can be followed in assigning DoC values during the visual block identification. In the following examples, DoC values are integers ranging from 1 to 10, although alternatively different ranges (e.g., made up of integers, real numbers, etc.) could be used. Situations may arise where multiple ones of the following rules may apply to a particular block, and could result in multiple DoC values for the block. Such situations can be resolved in different manners, such as selecting the largest DoC value assigned by one of the rules, selecting the smallest DoC value assigned by one of the rules, averaging the DoC values assigned by the rules, calculating a weighted average of the DoC values assigned by the rules, and so forth.

The following example rules are used to assign DoC values to visual blocks having general HTML tags (that is, to all HTML tags except for the <P> tag, the <TABLE> tag, the <TD> tag, and the <UL> tag):

if all of the children of the node are text nodes or virtual text nodes, then set the DoC value for the block to 10;

if the node has at least one text node child or at least one virtual text node child, and the node's width or height is smaller than a threshold (e.g., 150), then set the DoC value for the block to 8;

if the node is a navigation node (e.g., in the first round only, a node having a height that is more than twice its width, and having a width smaller than 200; in subsequent rounds, this rule is not applied), then set the DoC value for the block to 7;

if the node has at least one text node child or at least one virtual text node child, and further does not have a block node child, then set the DoC value for the block based on the node size as follows:

if both the width and height of the node are less than a first threshold value (e.g., 100), then set the DoC value for the block to 8;

if the height of the node is less than a second threshold (e.g., 200) or the width is less than a third threshold (e.g., 400), then set the DoC value for the block to 7; and if the area of the node (e.g., the product of the height and width of the node) is less than a fourth threshold (e.g., 100,000), then set the DoC value for the block to 6; and if none of the above rules applies to a block having a general HTML tag, then set the DoC value for the block to 5.

The following example rules are used to assign DoC values to visual blocks having <P> HTML tags:

if all the children of the node are text nodes or virtual text nodes, then set the DoC value for the block to 10;

if the node has at least one text node child or at least one virtual text node child, and the node's width or height is smaller than a threshold (e.g., 150), then set the DoC value for the block to 8;

if the node does not have a block node child, then set the DoC value for the block to 7; and if all of the block node children of the node are smaller than a threshold (e.g., Width<150 and Height<100), then:

if the node has at least one text node child or at least one virtual text node child, then set the DoC value for the block to 7; and otherwise, set the DoC value for the block to 6.

The following example rules are used to assign DoC values to visual blocks having <TABLE> HTML tags:

if the size of the biggest child node of the node is smaller than a threshold (e.g., 250*200), then set the DoC value for the block to 8;

if all the children of the node are smaller than a threshold (e.g., Width<150 and Height<100), then set the DoC value for the block 8 to 7; and if all the valid node children of the node are bigger than a threshold (e.g., Width>150 and Height>100), then set the DoC value for the block to 6.

The following example rules are used to assign DoC values to visual blocks having <TD> HTML tags:

if all the children of the node are text nodes or virtual text nodes, then set the DoC value for the block to 10;

if the node has at least one text node child or at least one virtual text node child, and the node's width or height is smaller than a threshold is (e.g., 150), then set the DoC value for the block to 8;

if the node does not have a block node child, then set the DoC value for the block to 7;

if all of the block node children of the node are smaller than a threshold (e.g., Width<150 and Height<100), then set the DoC value for the block to 7; and if the size of the biggest child node of the node is smaller than a threshold (e.g., 250*200), then set the DoC value for the block to 7.

The following example rules are used to assign DoC values to visual blocks having <UL> HTML tags:

if the node does not have a block node child, then set the DoC value for the block to 8;

if all the children nodes of the node have <LI> HTML tags, then set the DoC value for the block to 8; and if all the children nodes of the node are smaller than a threshold (e.g., 8 Width<150 and Height<100), then set the DoC for the block to 8.

These rules and an example of process 170 of FIG. 3 can be implemented, to for example, using an algorithm having a DivideDomtree procedure or function (shown in Table I below), and a Dividable procedure or function (shown in Table II below). In this algorithm, the value pRoot refers to the currently selected node, the value nLevel refers to the level of the currently selected node in the DOM tree, the pool refers to the group of visual blocks identified by the algorithm, the Top Block refers to the top node of the DOM tree or subtree being evaluated in this round (e.g., in the first round, the Top Block refers to the root node of the DOM tree), and child refers to a child of the currently selected node. The special routines and heuristic rules of the Dividable procedure or function are described above. Each time the DivideDomtree procedure or function is invoked, it is passed a node of the DOM tree as the value of pRoot, and a value of the level of that node in the DOM tree as the value of nLevel.

TABLE I

```
Algorithm DivideDomtree(pRoot, nLevel)
{
```

TABLE I-continued

```
    IF (Dividable(pRoot, nLevel) == TRUE){
        FOR EACH child OF pRoot {
            DivideDomtree(child, nLevel);
        }
    } ELSE {
        Put the sub-tree (pRoot) into the pool as a block;
    }
}
```

TABLE II

```
Algorithm Dividable(pRoot, nLevel)
{
    IF (pRoot is the Top Block){
        RETURN TRUE;
    } ELSE {
        Special routines for TABLE, TD, P, UL;
        Heuristic rules for general tags;
    }
}
```

Visual Separator Detection

Visual separator detection detects separators between different ones of the blocks identified by the visual block identification. These separators can take a variety of different forms, such as lines in the document, blank space in the document, different background colors for different blocks, and so forth. In certain embodiments, separators in the horizontal and/or vertical direction in the document are detected. Visual separator detection (e.g., in act 146 of FIG. 2 or implemented by visual separator detector 106 of FIG. 1) can be performed as follows.

The detected separators are horizontal or vertical regions in the document that do not visually intersect with any blocks in the pool of blocks identified by the visual block identification. These separators are used as indicators for discriminating different semantics within the document. A separator is represented by a 2-tuple $(P_s, P_e)$, where $P_s$ is the start pixel of the separator and $P_e$ is the end pixel of the separator. Each pixel $P_s$ and $P_e$ is identified as an X,Y-coordinate pair, and a rectangular region can be defined by setting the $P_s$ and $P_e$ pixels as opposite corners of the region (e.g., lower left and upper right corners, upper left and lower right corners, etc.). The width of the separator is calculated as the difference (e.g., in the X direction) between $P_s$ and $P_e$.

Reference is made to horizontal and vertical directions. Typically, in an X,Y-coordinate system, the horizontal direction refers to the X-axis while the vertical direction refers to the Y-axis. However, other orientations for the horizontal and vertical directions can alternatively be used.

Figure 4:
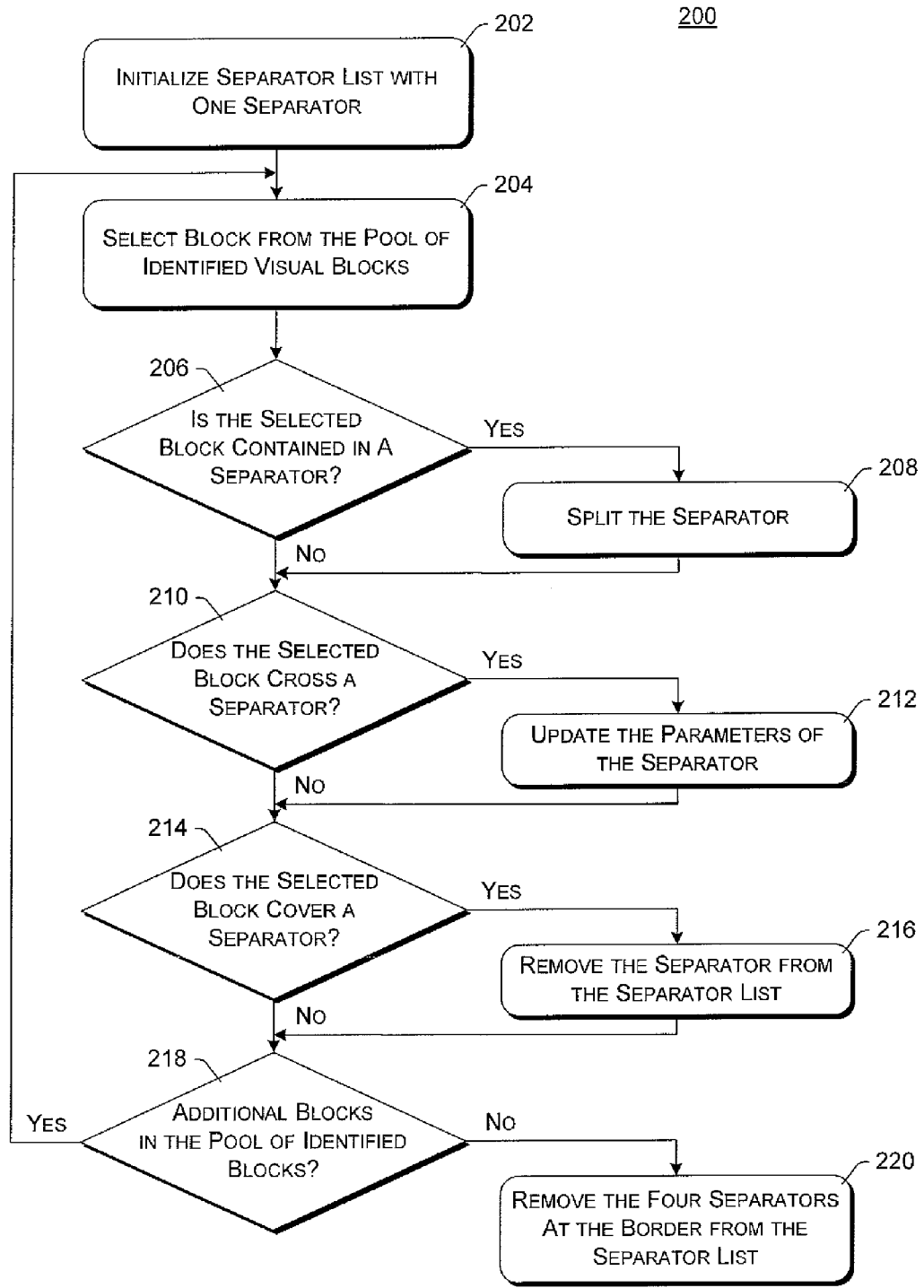
FIG. 4 is a flowchart illustrating an example process for performing visual separator detection.

FIG. 4 is a flowchart illustrating an example process 200 for performing visual separator detection. Process 200 illustrates act 146 of FIG. 2 in additional detail. Process 200 may be performed in software, firmware, hardware, or combinations thereof.

Initially, a separator list is initialized with one separator (act 202). This one separator includes all regions of the display area for the document that may potentially be a separator(s). In certain embodiments, this initial separator includes the entire area of the document, or alternatively this initial separator may be a single rectangular region that includes all of the blocks in the pool of visual blocks identified by the visual block identification.

A block from the pool of identified blocks is then selected (act 204). Blocks can be selected from the pool in any of a variety of manners (e.g., randomly, in the order they were added to the pool, by increasing or decreasing size, and so forth). A check is then made as to whether the selected block is contained in a separator of the separator list (act 206). A block is considered to be contained in a separator if the entire area of a block is included within the area of the separator. If the selected block is contained in a separator, then the separator is split into two separators (act 208). This split could be accomplished in different manners, such as by removing the separator that contains the block from the separator list and adding two new separators to the separator list, modifying the $P_s$ or $P_e$ pixels of the separator and adding a new separator, and so forth. The splitting of the separator results in what was previously a single separator becoming two smaller separators on either side of the block. When detecting horizontal separators, the two smaller separators would be above and below the block, and when detecting vertical separators, the two smaller separators would be to the left and to the right of the block.

After the separator is split in act 208, or if the selected block is not contained in a separator, a check is made as to whether the selected block crosses a separator (act 210). When detecting horizontal separators, a block is considered to cross a separator if the area of the block intersects a portion of the separator but less than the entire height of the separator. When detecting vertical separators, a block is considered to cross a separator if the area of the block intersects a portion of the separator but less than the entire width of the separator.

If the selected block crosses a separator, then the parameters of the separator are updated so that the block no longer crosses the separator (act 212). This updating of the parameters refers to modifying the $P_s$ and/or $P_e$ pixels of the separator so that the block no longer crosses the separator.

After the separator parameters are updated in act 212, or if the selected block does not cross a separator, a check is made as to whether the selected block covers a separator (act 214). When detecting horizontal separators, a block is considered to cover a separator if the area of the block intersects the entire height of at least part of the separator. When detecting vertical separators, a block is considered to cover a separator if the area of the block intersects the entire width of at least part of the separator.

If the selected block covers a separator, then the separator is removed from the separator list (act 216). After the separator is removed from the separator list in act 216, or if the selected block does not cover a separator, a check is made as to whether there are any additional blocks in the pool of identified blocks that have not yet been selected (act 218). If there are such blocks in the pool of blocks, then process 200 returns to select one of these remaining blocks in act 204. However, if there are no such blocks in the pool of blocks, then the four separators at the borders of the display (if such separators are present) are removed from the separator list (act 220).

The separator detection is performed to detect both horizontal separators and vertical separators. Horizontal separators could be detected first and then vertical separators detected, or vertical separators could be detected first and then horizontal separators detected, or alternatively the horizontal and vertical separators could be detected concurrently.

In certain embodiments, acts 202 through 218 of FIG. 4 are performed for both horizontal and vertical separators. Thus, two different separator lists can be generated. These two separator lists are combined in any of a variety of manners, such as taking the union of the two separator lists. For example, a final separator list may be generated that includes every separator in one of the two lists.

Thus, as can be seen from FIG. 4, the visual separator detection begins with a separator list includes one or more possible separator(s), and the list of possible separators is changed until, when the detection process is finished, the list includes the detected separators. The separator list is changed to add new separators, remove separators, and/or modify the parameters of separators based on whether the visual blocks overlap the separators as well as how they overlap the separators (e.g., the block is contained in a separator, the block crosses a separator, or the block covers a separator).

It should also be noted that the separators detected by process 200 can take any of a variety of different forms when the document is displayed. For example, the separators may be blank space in the document, one or more separator lines drawn in the document, images or other graphics in the documents, portions of the document shaded different colors, and so forth.

Figure 5A:
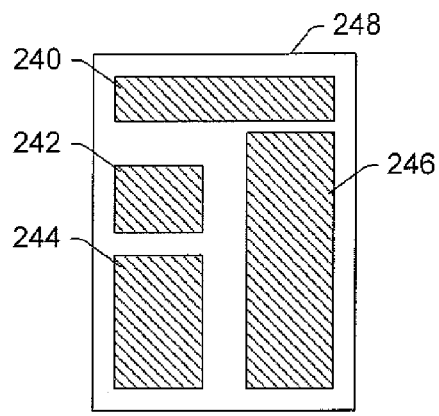
FIGS. 5a, 5b, 5c, 5d, 5e, and 5f illustrate an example of detecting horizontal separators.
Figure 5B:
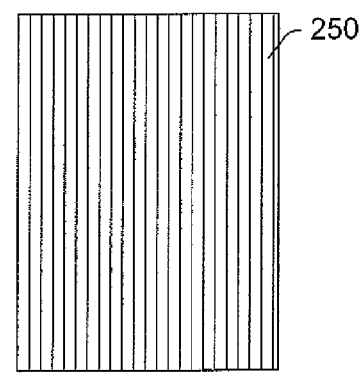

By way of example, detecting horizontal separators can be seen in the example illustrated in FIGS. 5*a*-5*f*. Assume that the visual block identification identifies four visual blocks 240, 242, 244, and 246 in a document 248 of FIG. 5*a*. The visual blocks 240, 242, 244, and 246 are illustrated with diagonal cross-hatching. Initially, only one separator 250 is in the separator list as illustrated in FIG. 5*b*. The separators are illustrated in FIGS. 5*b* through 5*f* with vertical lines. The separator 250 includes all of the visual blocks 240, 242, 244, and 246. Further assume that visual block 240 is the first block selected from the pool of visual blocks, visual block 242 is the second block selected from the pool of visual blocks, visual block 244 is the third block selected from the pool of visual blocks, and visual block 246 is the fourth block selected from the pool of visual blocks.

Figure 5C:
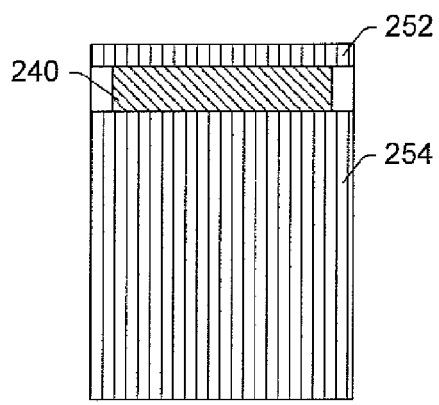
Figure 5D:
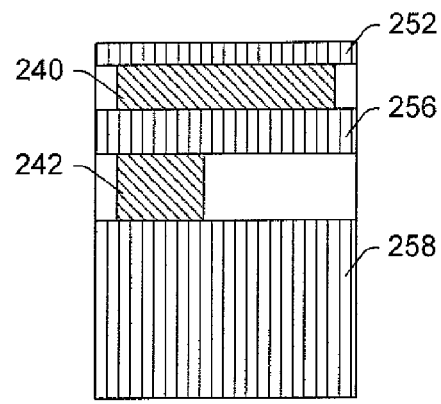
Figure 5E:
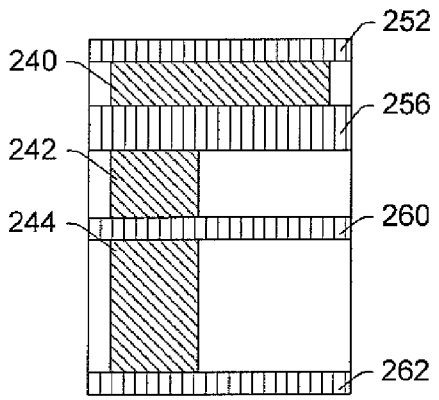

Visual block 240 is contained in separator 250, so separator 250 is split into two separators 252 and 254 as illustrated in FIG. 5*c*. Similarly, block 242 is contained in separator 254, so separator 254 is split into two separators 256 and 258 as illustrated in FIG. 5*d*. Furthermore, block 244 is contained in separator 258, so separator 258 is split into two separators 260 and 262 as illustrated in FIG. 5*e*.

Figure 5F:
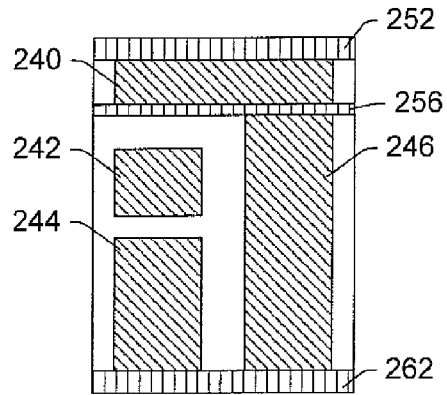

When visual block 246 is analyzed, it is determined that visual block 246 crosses separator 256 and also covers separator 260. So, the parameters of separator 256 are updated to reflect a smaller region, and separator 260 is removed from the separator list as illustrated in FIG. 5*f*.

Additionally, each of the separators detected in process 200 is assigned a weight. The weight of a separator is an indication of how visible the separator is when the document is displayed (e.g., separators with higher weights are more visible than separators with lower weights). The weight of a separator is assigned based on various characteristics of the visual blocks on either side of the separator. The weights assigned to separators are used for comparing the separators (e.g., their weights are compared). The weights assigned to the separators are typically not used for other purposes, so the weights can have virtually any unit (so long as it is consistent with or can be converted to a unit consistent with the units of weights of other separators in the document).

A set of rules is applied to determine the weights of the separators. When referring to blocks, the rules refer to the closest visual blocks on either side of the separator (for example, in FIG. 5*f*, the closest visual blocks to separator 256 would be block 240 on one side and block 246 on the other side). The following is an example set of rules that can be applied to determine the weights of the separators:

The greater the distance between blocks on different sides of the separator, the higher the weight of the separator. The distance can be, for example, the distance between the two closest edges of the two blocks. For example, for horizontal separators, if the distance is less than or equal to 10 pixels then set the weight of the separator to 15, if the distance is greater than 10 pixels but less than or equal to 20 pixels then set the weight of the separator to 25, and if the distance is greater than 20 pixels then set the weight of the separator to 35; for vertical separators, if the distance is less than or equal to 3 pixels then set the weight of the separator to 25, and if the distance is greater than 3 pixels then set the weight of the separator to 45.

If a visual separator is at the same position as particular HTML tags (e.g., the <HR> HTML tag), the weight of the separator is made higher. For example, set the weight of the separator to 50 if the visual separator is at the same position as an <HR> HTML tag.

For horizontal separators, if the font properties (e.g., font size and font weight) of blocks on different sides of the separator are different, the weight of the separator will be changed. This rule may apply only if, for each of the blocks, all of the text in the block has the same properties, or if at least a threshold amount of the text in the block has the same properties, etc. Additionally, the weight of the separator will be increased if the font size in the block before the separator is smaller than the font size in the block after the separator. For example, if the font size used in the block before the separator (e.g., above a horizontal separator) is larger than the font size used in the block after the separator (e.g., below a horizontal separator), then set the weight of the separator based on the font size used in the block before the separator (e.g., set the weight to 9 if the font size is greater than or equal to 36 point, set the weight to 8 if the font size is greater than or equal to 24 point but less than 36 point, set the weight to 7 if the font size is greater than or equal to 18 point but less than 24 point, set the weight to 6 if the font size is greater than or equal to 14 point but less than 18 point, set the weight to 5 if the font size is greater than 12 point but less than 14 point, and set the weight to zero if the font size is less than or equal to 12 point). However, if the font size used in the block before the separator is smaller than the font size used in the block after the separator, then set the weight of the separator based on the font size used in the block after the separator (e.g., set the weight to 10 if the font size is greater than or equal to 36 point, set the weight to 9 if the font size is greater than or equal to 24 point but less than 36 point, set the weight to 8 if the font size is greater than or equal to 18 point but less than 24 point, set the weight to 7 if the font size is greater than or equal to 14 point but less than 18 point, set the weight to 6 if the font size is greater than 12 point but less than 14 point, and set the weight to zero if the font size is less than or equal to 12 point).

If background colors of blocks on different sides of the separator are different, then the weight of the separator will be increased. For example, if the background colors on different sides of the separator are different, then set the weight of the separator to 40.

For horizontal separators, when the structures of the blocks beside the separator are very similar, then the weight of the separator will be decreased. For example, if both blocks beside the separator are text blocks having the same font size and the same font weight, then set the weight of the separator to zero.

If multiple ones of these rules apply to a particular situation, then one of the weights set by these rules can be selected, or the weights set by these rules can be combined. For example, the smallest (or alternatively the largest) of the assigned weights may be used as the weight of the separator, the average of all the assigned weights may be used as the weight of the separator, a weighted average of all the assigned weights may be used as the weight of the separator, and so forth.

Content Structure Construction

Content structure construction generates a content structure for the document based on the blocks identified in the visual block identification as well as the separators detected in the visual separator detection. Content structure construction (e.g., in act 148 of FIG. 2 or implemented by content structure constructor 108 of FIG. 1) can be performed as follows.

The content structure is a set of one or more portions of the document that represents the semantic content of the document. In certain embodiments, the content structure is a hierarchical tree structure of semantic content.

Figure 6:
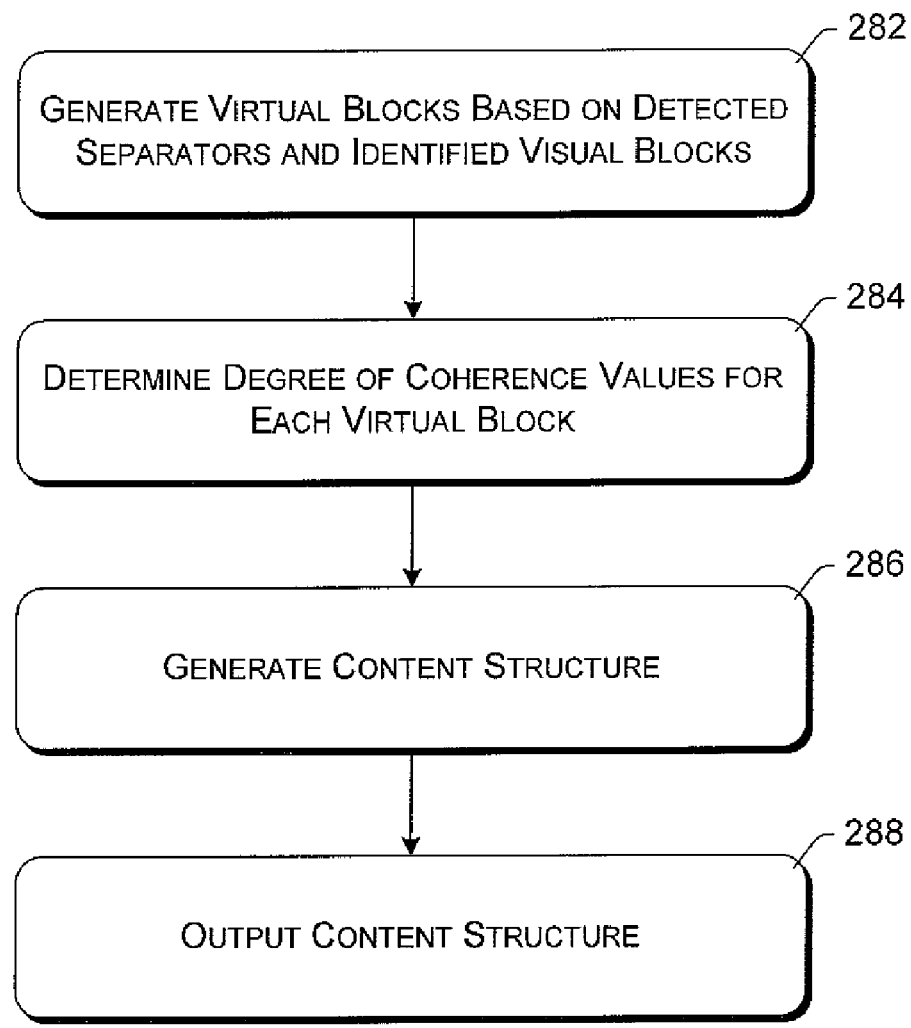
FIG. 6 is a flowchart illustrating an example process for performing content structure construction.

FIG. 6 is a flowchart illustrating an example process 280 for performing content structure construction. Process 280 illustrates act 148 of FIG. 2 in additional detail. Process 280 may be performed in software, firmware, hardware, or combinations thereof.

Initially, one or more virtual blocks are generated based on the detected separators and the identified visual blocks (act 282). The virtual blocks are generated by analyzing the detected separators, starting with those separators having the lowest weight. The blocks on either side of the detected separators are merged into a single virtual block. This merging continues with the separators having the next lowest weight, and continues until separators with a maximum weight are met (this maximum weight may be defined as the largest weight calculated by the visual separator detection discussed above for this particular set of identified visual blocks, or alternatively may be some pre-defined or pre-programmed value).

Once the virtual blocks are generated, a degree of coherence value is determined for each of the virtual blocks (act 284). The degree of coherence value is calculated based on the weight of the separator between the two blocks that were merged to generate the virtual block (this separator may be between two visual blocks or between two virtual blocks). In certain embodiments, the degree of coherence value for a virtual block is determined according to the following example rules. In some of these rules, two variables WEIGHT_TMP_TITLE2 and WEIGHT_TMP_TITLE1 are used. The values of the WEIGHT_TMP_TITLE2 and WEIGHT_TMP_TITLE1 variables are determined after all the separators are detected (e.g., after process 200 of FIG. 4 is finished). All of the separators having text blocks on both sides are sorted by weight. The highest of these weights is the value assigned to the WEIGHT_TMP_TITLE1 variable, and the second highest of these weights is the value assigned to the WEIGHT_TMP_TITLE2 variable. If there are no such separators, then both of the WEIGHT_TMP_TITLE1 and WEIGHT_TMP_TITLE2 variables are set to the value −1. If there is only one such separator, then the weight of that one separator is used as the value of WEIGHT_TMP_TITLE1, and the value −1 is used as the value of WEIGHT_TMP_TITLE2. These example rules are:

if the weight of the selector between the two blocks being merged is less than or equal to zero, then set the degree of coherence value to 10;

if the weight of the selector between the two blocks being merged is less than or equal to WEIGHT_TMP_TITLE2, then set the degree of coherence value to 7;

if the weight of the selector between the two blocks being merged is less than or equal to WEIGHT_TMP_TITLE1, then set the degree of coherence value to 6;

if the weight of the selector between the two blocks being merged is less than or equal to 9, then set the degree of coherence value to 5;

if the weight of the selector between the two blocks being merged is less than or equal to 20, then set the degree of coherence value to 5;

if the weight of the selector between the two blocks being merged is less than or equal to 40, then set the degree of coherence value to 4;

if the weight of the selector between the two blocks being merged is less than or equal to 50, then set the degree of coherence value to 2;

if none of the above rules are satisfied, then set the degree of coherence value to 1.

The content structure is then generated (act 286). The content structure is generated based at least in part on the granularity requirement and which virtual blocks, if any, satisfy the granularity requirement. As discussed above, each leaf node of the content structure is analyzed to determine whether the granularity requirement is satisfied. In certain embodiments, a permitted degree of coherence (PDoC) value is defined, and, in order to satisfy the granularity requirement, each leaf node of the content structure is required to have a DoC value greater than (or alternatively greater than or equal to) the PDoC value. The PDoC value can be a pre-defined value (e.g., determined empirically by a system designer). Any of a range of values for the PDoC value can be used, with greater values typically resulting in content structures with more but smaller visual blocks. An example range of PDoC values is from 6 to 9.

The content structure generated in act 286 can include virtual blocks and/or visual blocks. The DoC value for each virtual block identified in act 282 is compared to the PDoC value. For each virtual block having a DoC value greater than the PDoC value, the children of that virtual block are not output as blocks in the content structure.

The content structure is then output (act 288). The content structure can be output in any of a variety of formats, and in certain embodiments is output in a hierarchical tree format, with the nodes of the tree representing virtual blocks and/or visual blocks.

Figure 7:
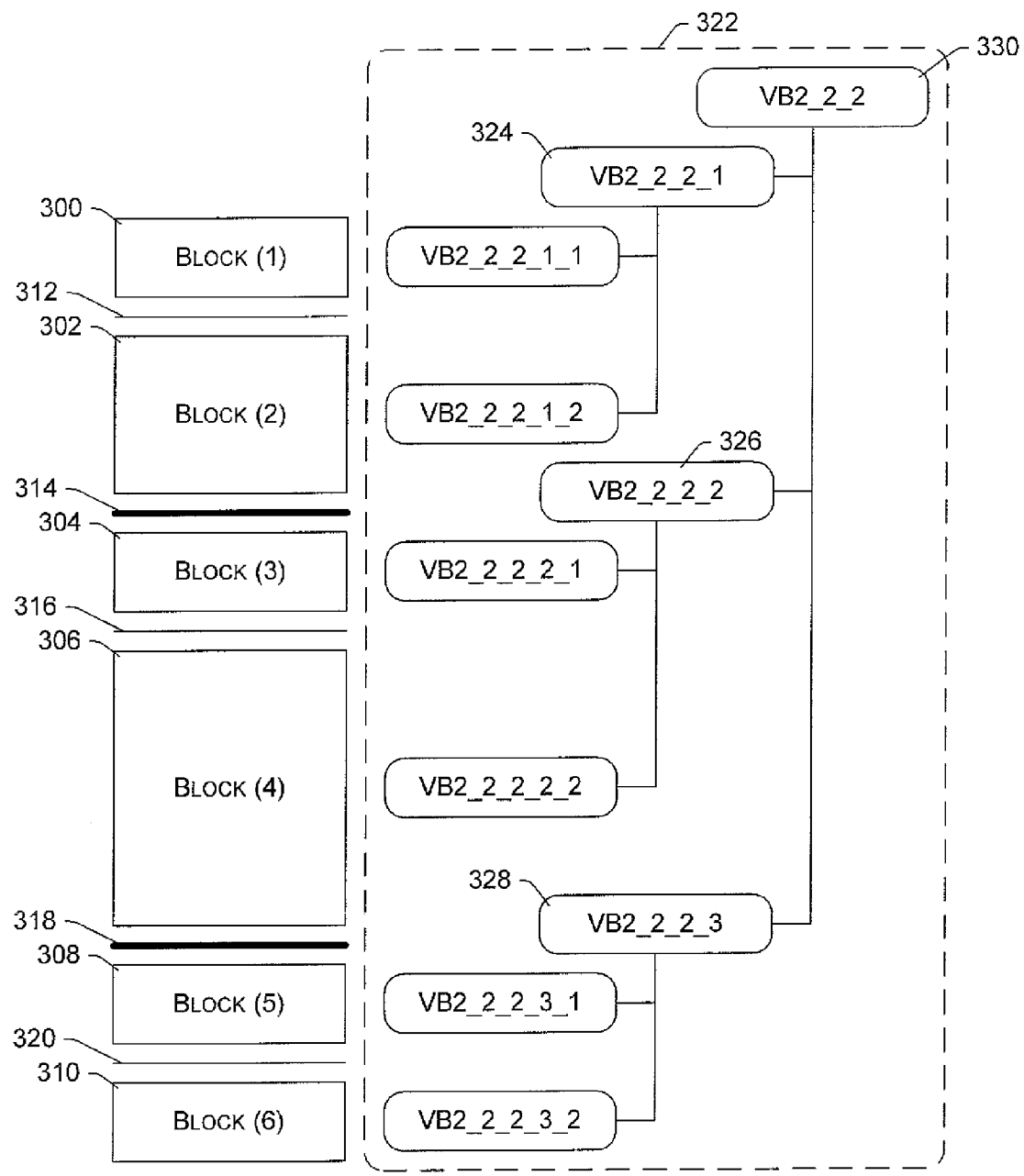
FIG. 7 illustrates an example of generating virtual blocks and a content structure tree.

FIG. 7 illustrates an example of generating virtual blocks and a content structure tree. In FIG. 7, six visual blocks 300, 302, 304, 306, 308, and 310 are shown, having been identified by the visual block identification. Additionally, separators 312, 314, 316, 318, and 320 between the blocks are illustrated, with the thicker-lined separators (separators 314 and 318) being larger weights than the thinner-lined separators (separators 312, 316, and 320).

Each of the visual blocks 300-310 has a corresponding content structure block in the content structure tree 322. Additionally, a virtual block 324 is generated by merging blocks 300 and 302, virtual block 324 having a DoC value based on the weight of separator 312. A virtual block 326 is generated by merging blocks 304 and 306, virtual block 326 having a DoC value based on the weight of separator 316. A virtual block 328 is generated by merging blocks 308 and 310, virtual block 328 having a DoC value based on the weight of separator 320. Additionally, a virtual block 330 is generated by merging virtual blocks 324, 326, and 328. The weights of separators 314 and 318 are the same, so the DoC value for block 330 can be based on the weight of either separator 314 or 318.

The content structure output based on the virtual blocks illustrated in FIG. 7 depends on the DoC values of the virtual blocks 324, 326, 328, and 330. For example, if the DoC value of virtual block 324 is greater than the PDoC value, then virtual block 324 is output as a block in the content structure but the individual visual blocks 300 and 302 are not output as blocks in the content structure. However, if the DoC value of virtual block 324 is not greater than the PDoC value, then virtual block 324 is not output as a block in the content structure but the individual visual blocks 300 and 302 are output as blocks of the content structure. By way of another example, if the DoC value of virtual block 330 is greater than the PDoC value, then virtual block 330 is output as a block in the content structure but the individual virtual blocks 324, 326, and 328 are not output as blocks in the content structure, and the individual visual blocks 300, 302, 304, 306, 308, and 310 are not output as blocks in the content structure.

Document Retrieval

Figure 8:
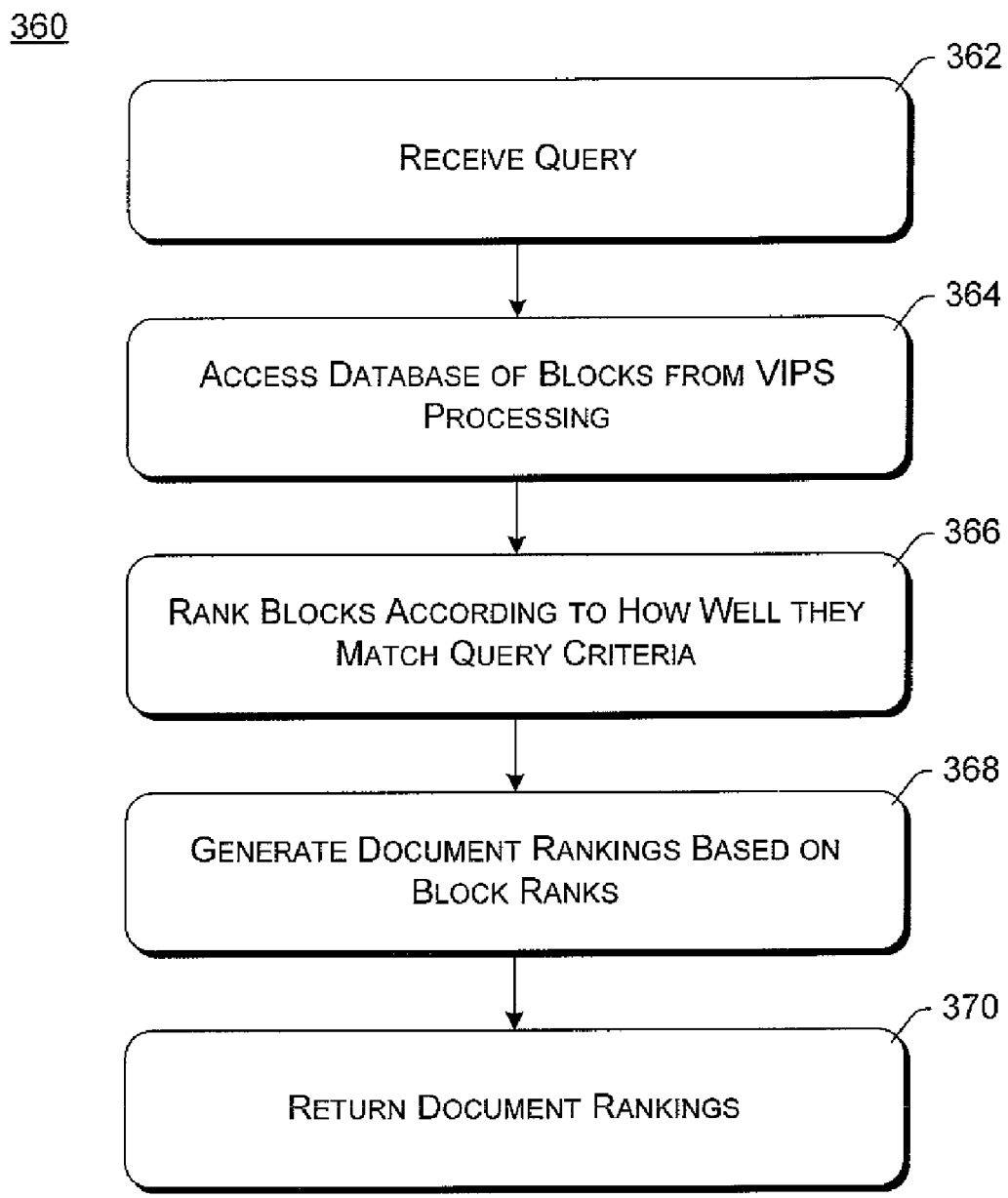
FIG. 8 is a flowchart illustrating an example process for performing document retrieval using vision-based document segmentation.

Document retrieval techniques can be employed using the vision-based document segmentation described herein. Such document retrieval techniques may rely on the vision-based document segmentation alone, or alternatively in combination with more traditional search techniques FIG. 8 is a flowchart illustrating an example process 360 for performing document retrieval using the vision-based document segmentation described herein. Process 360 may be implemented, for example, by document retrieval module 110 of FIG. 1. Process 360 may be performed in software, firmware, hardware, or combinations thereof. Process 360 can be used for retrieving any of a variety of different types of documents, including, for example, web pages (e.g., available over the Internet and/or an intranet), papers written by individuals, abstracts or summaries, and so forth.

Initially, a query is received (act 362). Typically, the query is input by a user, although alternatively the query may be received from some other source (e.g., a remote device, a software application, etc.). A database of blocks obtained from the vision-based document segmentation technique discussed herein is accessed (act 364). Typically, the vision-based document segmentation process will have been previously performed and the resulting content structure (including visual blocks and/or virtual blocks) already stored in a database or some other accessible location. Alternatively, the vision-based document segmentation process may be performed on one or more documents in response to receipt of the query in act 362.

Once accessed, the blocks of the content structure are ranked according to how well they match the query criteria (act 366). The visual blocks and/or the virtual blocks can be ranked in act 366. The query received in act 362 includes one or more search terms, also referred to as query criteria or query terms. In certain embodiments, only those blocks that include at least one of the search terms (or alternatively only those blocks that include all of the search terms) are ranked in act 366. Alternatively, other limits may be imposed on the number of blocks that are ranked (e.g., process 360 may be configured to rank only 50 or 100 blocks). The rankings based on the blocks can be generated in any of a variety of different manners. For example, the rankings can be based on one or more of: how many of the search terms are included in the block, the location of the various search terms in the block, how frequently the search terms occur in the block, and so forth.

Document rankings are then generated based on the block rankings (act 368). The document rankings can be generated in any of a variety of manners. In certain embodiments, the rank of the highest ranking block from the document is used as the ranking for the document. Alternatively, the rankings of all the blocks in the document may be combined (e.g., by generating an average of the rankings of all the blocks, by generating a weighted average of the rankings of all the blocks, etc.) to generate the ranking for the document.

The document rankings are then returned (act 370), e.g., to the requester. The document rankings can be returned in a variety of different manners, such as an identifier (e.g., title or uniform resource locator (URL)) and numeric ranking for each document, a display of an identifier of each document in order according to their rankings (e.g., without displaying an explicit numeric ranking for each document), excerpts from the documents that include the search criteria, the actual documents returned in an order according to their rank, and so forth.

It is to be appreciated that various modifications can be made to process 360. For example, in act 366 not all of the accessible documents may be ranked or searched. By way of another example, blocks of the documents may be returned in act 370 rather than the entire documents.

Figure 9:
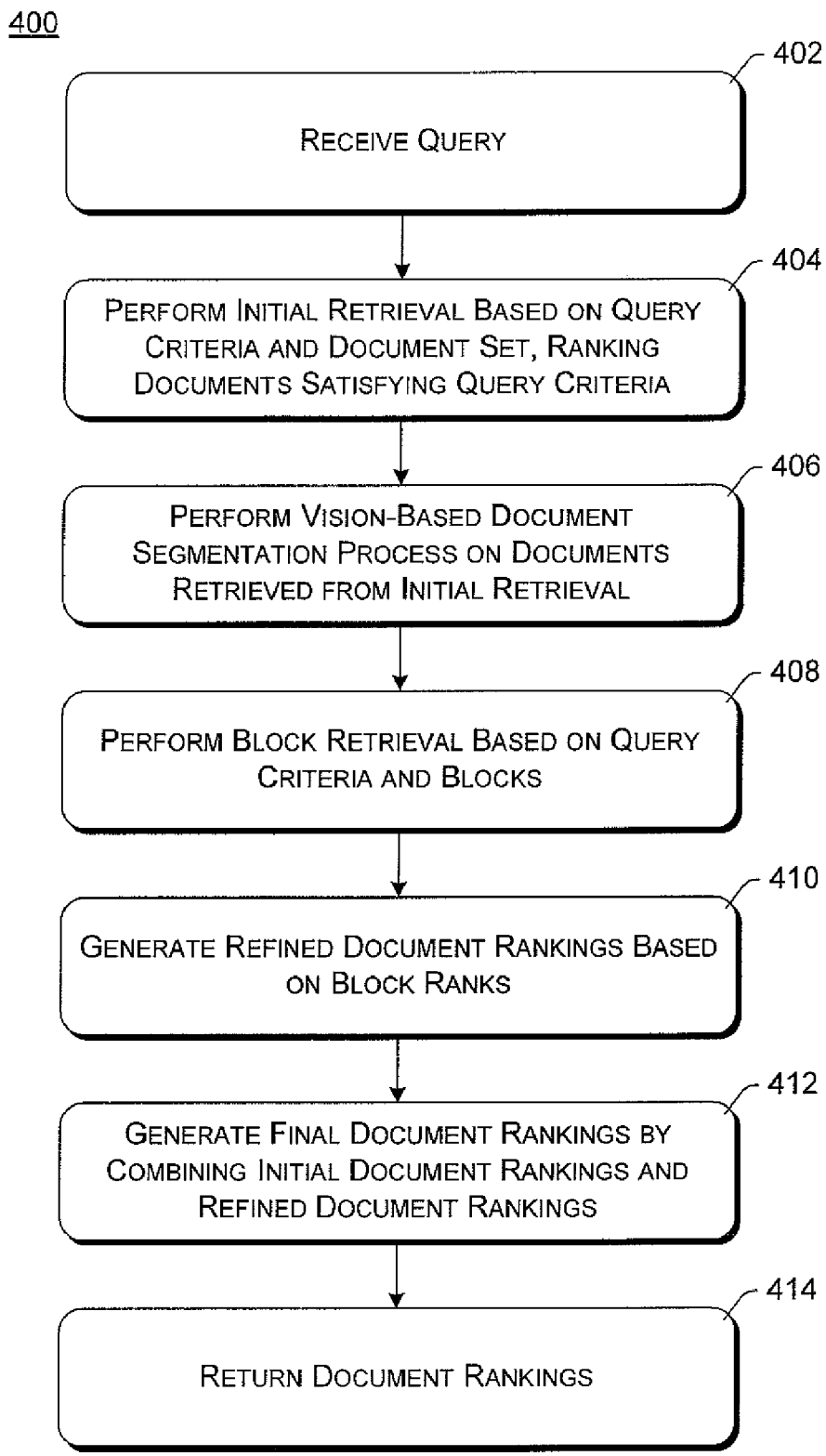
FIG. 9 is a flowchart illustrating another example process for performing document retrieval using vision-based document segmentation.

FIG. 9 is a flowchart illustrating another example process 400 for performing document retrieval using the vision-based document segmentation described herein. Process 400 may be implemented, for example, by document retrieval module 110 of FIG. 1. Process 400 may be performed in software, firmware, hardware, or combinations thereof. Analogous to process 360 of FIG. 8, process 400 can be used for retrieving any of a variety of different types of documents, including, for example, web pages (e.g., available over the Internet and/or an intranet), papers written by individuals, abstracts or summaries, and so forth.

Process 400 is similar to process 360, however the vision-based document segmentation is not performed on all of the possible documents. Rather, an initial search is performed, and the vision-based document segmentation process is performed using the documents from the initial search.

Initially, a query is received (act 402). Analogous to process 360, the query may be a user query or from some other source, and the query includes one or more search terms. An initial document retrieval is performed on the document set, and the documents satisfying the query criteria are ranked (act 404). This initial retrieval can be performed in any of a variety of manners. An example of such an initial retrieval process in act 404 is described in Robertson, S. E., "Overview of the Okapi Projects", Journal of Documentation, Vol. 53, No. 1, 1997, pp. 3-7. Any of a variety of conventional web search engines can also be used in act 404.

Process 400 then proceeds with performing the vision-based document segmentation process on the documents retrieved in the initial retrieval (act 406). Block retrieval is then performed using the query criteria (search terms) and the blocks obtained from the vision-based document segmentation (act 408), analogous to act 366 of FIG. 8. Refined document rankings are then generated based on the block ranks (act 410), analogous to the discussion above in act 366 of FIG. 8.

Final document rankings are then generated by combining the initial document rankings from act 404 and the refined document rankings from act 410 (act 412). This combining can be performed in any of a variety of manners. For example, the rankings from acts 404 and 410 may be averaged together, or a weighted average for the rankings from acts 404 and 410 may be used. Alternatively, the highest of the rankings from acts 404 and 410 for a particular document may be used as the ranking for that document. In yet another alternative, the ranking from act 410 may be used in place of the ranking from act 404.

Once the final document rankings are generated, the document rankings are returned (act 414), analogous to act 370 of FIG. 8.

Figure 10:
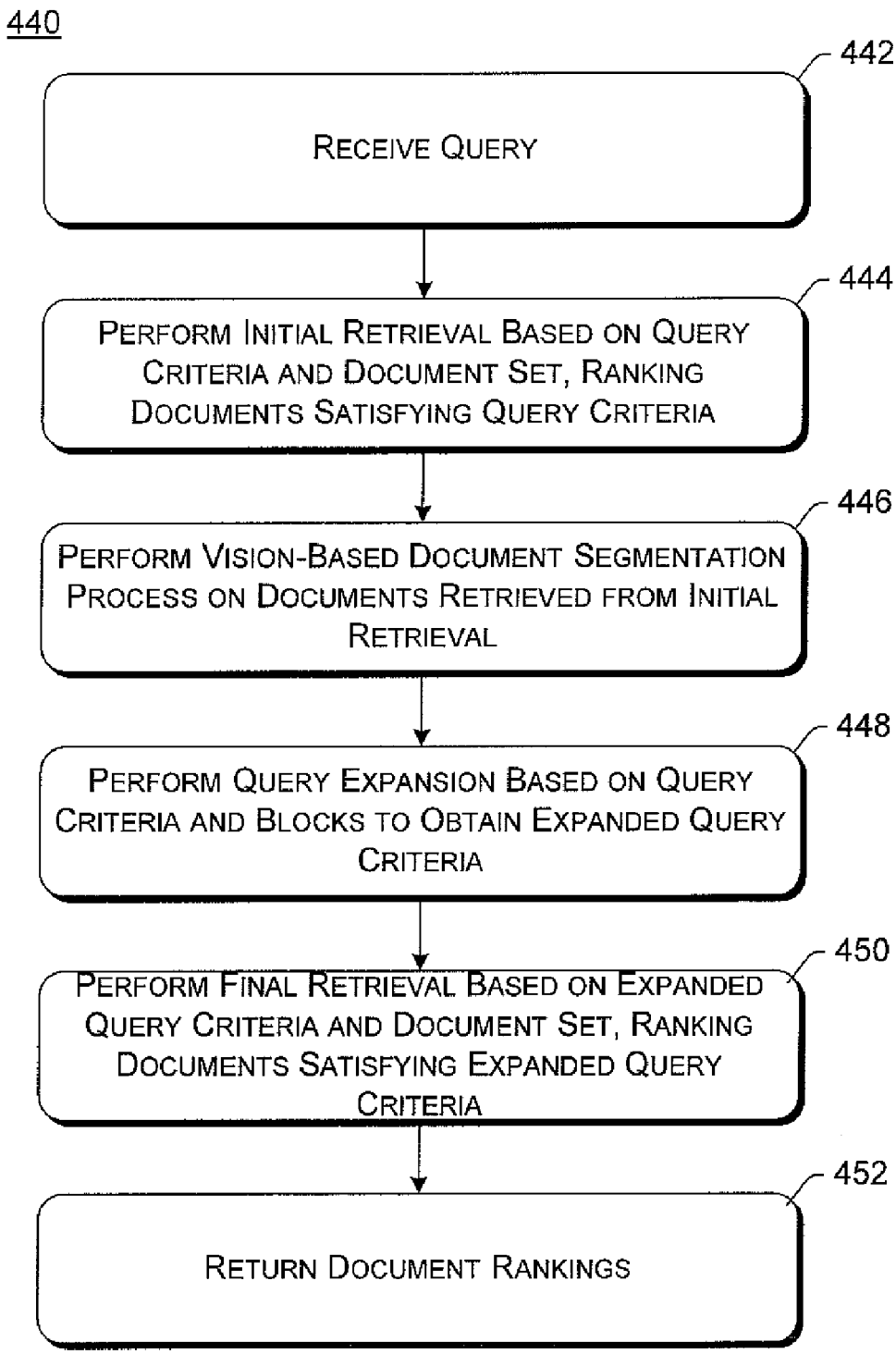
FIG. 10 is a flowchart illustrating another example process for performing document retrieval using vision-based document segmentation.

FIG. 10 is a flowchart illustrating another example process 440 for performing document retrieval using the vision-based document segmentation described herein. Process 440 may be implemented, for example, by document retrieval module 110 of FIG. 1. Process 440 may be performed in software, firmware, hardware, or combinations thereof. Analogous to process 360 of FIG. 8, process 440 can be used for retrieving any of a variety of different types of documents, including, for example, web pages (e.g., available over the Internet and/or an intranet), papers written by individuals, abstracts or summaries, and so forth.

Process 440 is similar to process 400 of FIG. 9, however the vision-based document segmentation is used to expand the query criteria.

Initially, a query is received (act 442), analogous to act 402 of FIG. 9. An initial document retrieval is performed on the document set, and the documents satisfying the query criteria are ranked (act 444), analogous to act 404 of FIG. 9. The vision-based document segmentation process is then performed on the documents retrieved in the initial retrieval (act 446), analogous to act 406 of FIG. 9.

However, rather than performing block retrieval as is done in FIG. 9, the blocks of the content structure obtained from the vision-based document segmentation process, along with the query criteria, are used to perform query expansion (act 448). The query expansion can be performed in any of a variety of manners.

In certain embodiments, the query expansion is performed by using the top-ranking blocks for expansion term selection (e.g., the ten blocks having the highest rankings, or the 10% of the blocks having the highest rankings). The blocks are ranked according to how well they satisfy the original query terms (analogous to act 366 of FIG. 8). The expansion terms are selected in any of a variety of known manners, however, unlike traditional query expansion, the expansion terms are selected based on the blocks obtained from the vision-based document segmentation process. For example, all of the terms (except for the original query terms) in the blocks obtained from the vision-based document segmentation process are weighted according to the following term selection value TSV:

$$TSV = w^{(1)} \times \frac{r}{R}$$

where r represents the number of blocks which contain the term, R represents the total number of blocks obtained from the vision-based document segmentation process, and $w^{(1)}$ represents the Robertson/Spark Jones weight of T in Q, where Q represents the original query (received in act 442) and T represents the search terms in the original query.

Given these weighted expansion terms, a number of these terms are selected to be used as the expansion terms. Various numbers of these terms can be selected, and in certain embodiments the top ten terms are selected as the expansion terms (that is, the ten terms having the largest term selection values TSV).

A final retrieval is then performed based on the expanded query criteria and the document set, and the documents satisfying the expanded query criteria are ranked (act 450). Act 450 is performed analogous to act 444, except that the expanded query is used rather than the received criteria. The expanded query includes the original query terms as well as the expansion terms. In certain embodiments, the terms in the expanded query are weighted. The terms can be weighted in a variety of manners to give a preference to the original query terms when determining which documents match the query terms and/or when ranking the documents. For example, the terms for the expanded query can be weighted as follows. For original terms (those terms received as part of the query in act 442), the new weight of the terms is tf×2, where tf represents the term's frequency in the query. For each expansion term, the weight of the term is set as follows:

$$\frac{1 - (n - 1)}{m}$$

where n represents the TSV rank value of the term, and m is the number of expansion terms (e.g., ten in certain embodiments).

The document rankings obtained from the final retrieval in act 450 are then returned (act 452), analogous to act 414 of FIG. 9.

Additionally, in certain embodiments the document retrieval discussed above with reference to FIG. 8, FIG. 9, or FIG. 10 may employ a combined document segmentation approach which combines the visual-based document segmentation process discussed above with a fixed length approach. In this combined document segmentation approach, visual blocks are obtained as discussed above (e.g., with reference to FIG. 2). Given these visual blocks, overlapped windows are used to divide at least some of the blocks into smaller units. The first window begins from the first word of the first visual block and subsequent windows overlap preceding windows by a certain amount (e.g., one-half) until the end of the block. The portions of the visual block corresponding to these windows are output as the final block. For visual blocks that are smaller than the length of the window (the window typically being a fixed value), the visual blocks are output as final blocks without further partition. However, by partitioning larger blocks into smaller blocks that are the size of the window, the variance in lengths of the various blocks is reduced.

Using this combined document segmentation approach, the final blocks output by the combined document segmentation approach are used in place of the visual and/or virtual blocks of the content structure during the document retrieval process.

EXAMPLE ENVIRONMENT

Figure 11:
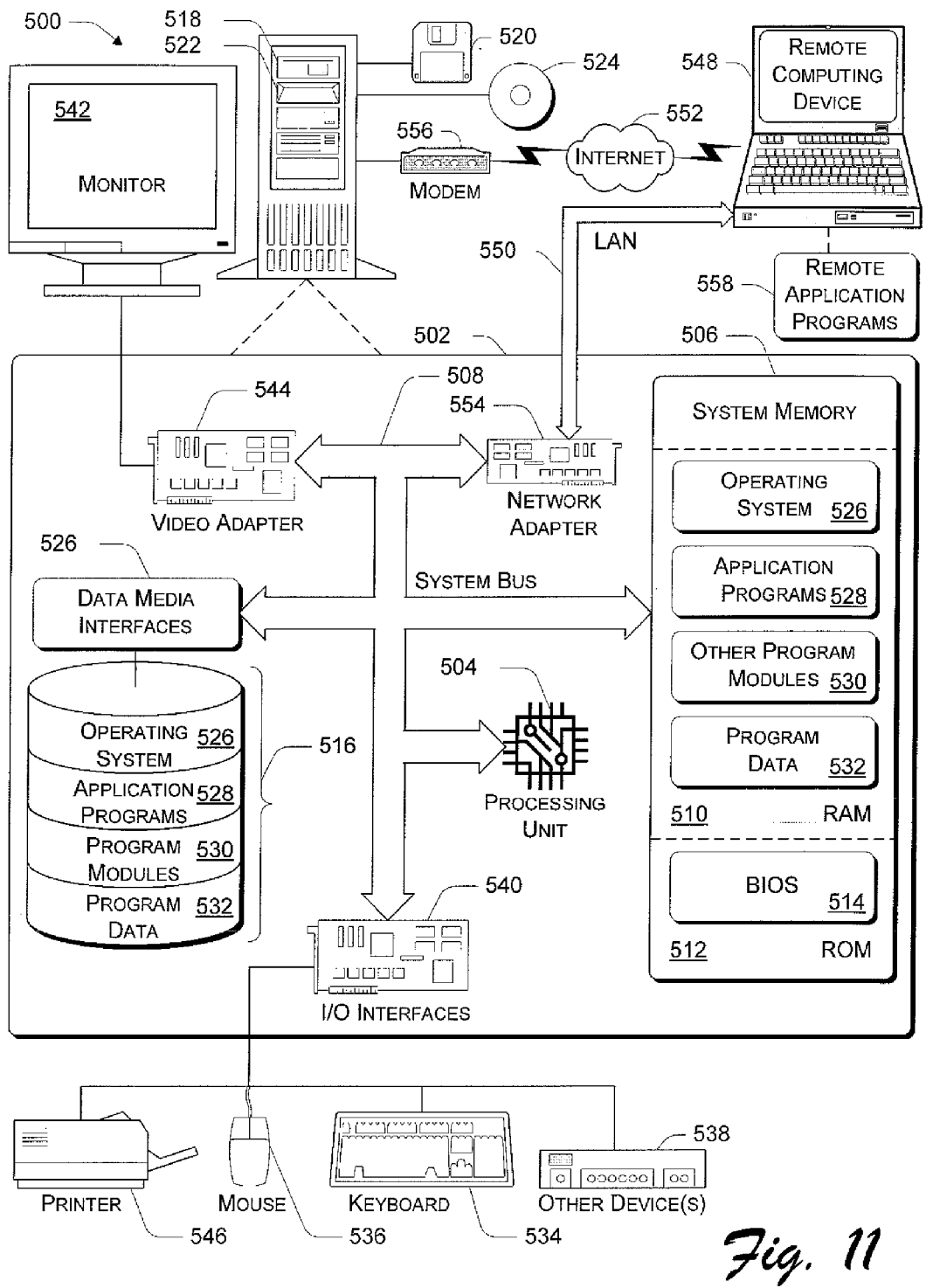
FIG. 11 illustrates an example of a general computer environment, which can be used to implement the techniques described herein.

FIG. 11 illustrates an example of a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. Computer 502 can implement, for example, visual block extractor 104, visual separator detector 106, content structure constructor 108, and/or document retrieval module 110 of FIG. 1. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 11 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are examples and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

CONCLUSION

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Various flowcharts are described herein and illustrated in the accompanying Figures. The ordering of acts in these flowcharts are examples only—these orderings can be changed so that the acts are performed in different orders and/or concurrently.

Additionally, many specific numeric examples are given herein (e.g., particular threshold values, particular sizes, particular weights, etc.). These specific numeric examples are only examples, and other values can alternatively be used.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors of a device, causes the one or more processors to:
receive a query including one or more search terms;
rank a plurality of blocks based on how well the plurality of blocks matches the one or more search terms, wherein each of the plurality of blocks is part of one document of a plurality of documents, and wherein each of the plurality of blocks is obtained by visual segmentation of one of the plurality of documents;
ranking the blocks according to the location of the one or more search terms in the block and how frequently the one or more search terms occur in the block;
for each of the plurality of documents, rank the document based at least in part on the rankings of the blocks that are part of the document; and
return, in response to the query, an indication of the rankings of one or more of the plurality of documents.

2. One or more computer readable media as recited in claim 1, wherein the instructions that cause the one or more processors to rank the document comprise instructions that cause the one or more processors to:
identify the ranking for each block that is part of the document;
select, as the ranking for the document, the highest ranking of the identified rankings.

3. One or more computer readable media as recited in claim 1, wherein the instructions that cause the one or more processors to rank the document comprise instructions that cause the one or more processors to:
identify the ranking for each block that is part of the document;
combine the rankings for each block to generate a ranking for the document;
wherein the ranking for each document includes an average ranking of all the blocks or a weighted average ranking of all the blocks.

4. One or more computer readable media as recited in claim 3, wherein generating the combined ranking for the document includes an average ranking of all the blocks and a weighted average ranking of all the blocks.

5. One or more computer readable media as recited in claim 1, wherein the visual segmentation of a document comprises:
identifying a plurality of visual blocks in the document;
detecting one or more separators between the visual blocks of the plurality of visual blocks; and
constructing, based at least in part on the plurality of visual blocks and the one or more separators, a content structure for the document, wherein the content structure identifies the different visual blocks as different portions of semantic content of the document, and wherein the different visual blocks are the blocks of the plurality of blocks that are part of the document.

6. One or more computer readable media as recited in claim 5, wherein the document is described by a tree structure having a plurality of nodes, and wherein identifying the plurality of visual blocks in the document comprises:
identifying a group of candidate nodes of the plurality of nodes;
for each node in the group of candidate nodes:
determining whether the node can be divided, and
if the node cannot be divided, then identifying the node as representing a visual block.

7. One or more computer readable media as recited in claim 1, wherein the instructions that cause the one or more processors to rank the document comprise instructions that cause the one or more processors to:
rank only those blocks that include two or more search terms.

8. One or more computer readable media having stored thereon a plurality of instructions that, when executed by one or more processors of a device, causes the one or more processors to:
generate first rankings for a plurality of documents based on how well the plurality of documents match search criteria;
generate second rankings based on how well a plurality of blocks matches the one or more search terms, wherein each block is part of one of the plurality of documents, and wherein each of the plurality of blocks is obtained by visually segmenting each of the plurality of documents into blocks;
rank the blocks according to the location of the one or more search terms in the block and how frequently the one or more search terms occur in the block; and
generate final rankings for the plurality of documents based at least in part on the second rankings.

9. One or more computer readable media as recited in claim 8, wherein the instructions that cause the one or more processors to generate final rankings comprise instructions that cause the one or more processors to use, as the final rankings, the second rankings.

10. One or more computer readable media as recited in claim 8, wherein the instructions that cause the one or more processors to generate final rankings comprise instructions that cause the one or more processors to select, as a final ranking for a document of the plurality of documents, whichever ranking of the first ranking for the document and the second ranking of the document is higher.

11. One or more computer readable media as recited in claim 8, wherein the instructions that cause the one or more processors to generate final rankings comprise instructions that cause the one or more processors to generate a final ranking for a document of the plurality of documents by averaging the first ranking of the document and the second ranking of the document.

12. One or more computer readable media as recited in claim 8, wherein the instructions that cause the one or more processors to visually segment a document comprise instructions that cause the one or more processors to:
identify a plurality of visual blocks in the document;
detect one or more separators between the visual blocks of the plurality of visual blocks; and
construct, based at least in part on the plurality of visual blocks and the one or more separators, a content structure for the document, wherein the content structure identifies the different visual blocks as different portions of semantic content of the document.

13. One or more computer readable media as recited in claim 12, wherein the document is described by a tree structure having a plurality of nodes, and wherein the instructions that cause the one or more processors to identify the plurality of visual blocks in the document comprise instructions that cause the one or more processors to:
identify a group of candidate nodes of the plurality of nodes;
for each node in the group of candidate nodes:
determine whether the node can be divided, and
if the node cannot be divided, then identify the node as representing a visual block.

14. A method of searching a plurality of documents, the method comprising:
receiving a request to search the plurality of documents stored on a device, wherein the request includes query criteria;

identifying a subset of the plurality of documents based on the query criteria; identifying, for each of the subset of documents, a plurality of blocks by visually segmenting the document;

expanding, based on the content of the plurality of blocks, the query criteria; and identifying a second subset of the plurality of documents based on the expanded query criteria; and ranking the blocks according to the location of query criteria in the block and how frequently the query criteria occur in the block.

15. A method as recited in claim 14, returning, in response to the request, identifiers of the second subset of documents.

16. A method as recited in claim 14, ranking each document of the second subset of the plurality of documents; and returning, in response to the request, identifiers of the second subset of documents and an indication of the ranking of each document of the second subset of documents.

17. A method as recited in claim 14, wherein the visually segmenting the document comprises:

identifying a plurality of visual blocks in the document;

detecting one or more separators between the visual blocks of the plurality of visual blocks; and constructing, based at least in part on the plurality of visual blocks and the one or more separators, a content structure for the document, wherein the content structure identifies the different visual blocks as different portions of semantic content of the document, and wherein the different visual blocks are the plurality of blocks for the document.

18. A method as recited in claim 17, wherein the document is described by a tree structure having a plurality of nodes, and wherein identifying the plurality of visual blocks in the document comprises:

identifying a group of candidate nodes of the plurality of nodes;

for each node in the group of candidate nodes:

determining whether the node can be divided, and if the node cannot be divided, then identifying the node as representing a visual block.

19. One or more computer readable media as recited in claim 14, wherein the expanded query criteria includes the original query terms and one or more expansion terms and the one or more expansion terms are selected based on the blocks obtained from the vision-based document segmentation process.

* * * * *